(12) United States Patent
Akkanen

(10) Patent No.: US 6,588,953 B2
(45) Date of Patent: Jul. 8, 2003

(54) ROUTING IN A COMMUNICATION NETWORK

(75) Inventor: Jyrki Akkanen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/050,306

(22) Filed: Jan. 15, 2002

(65) Prior Publication Data

US 2002/0061010 A1 May 23, 2002

Related U.S. Application Data

(63) Continuation of application No. PCT/FI01/00449, filed on Jun. 14, 2000.

(30) Foreign Application Priority Data

Jun. 14, 2000 (FI) .............................................. 20001415

(51) Int. Cl.⁷ .............................................. H04L 12/46
(52) U.S. Cl. ..................................... 400/351; 370/237
(58) Field of Search ................................ 370/230–234, 370/237–238.1, 255–256, 600, 403–408

(56) References Cited

U.S. PATENT DOCUMENTS

| | | | |
|---|---|---|---|
| 5,444,694 A | * 8/1995 | Millet et al. ................. | 370/224 |
| 5,793,765 A | 8/1998 | Boer et al. | |
| 5,872,773 A | * 2/1999 | Katzela et al. ............... | 370/256 |
| 6,324,674 B2 | * 11/2001 | Andreev et al. .............. | 716/12 |

FOREIGN PATENT DOCUMENTS

| | | |
|---|---|---|
| EP | 0637153 | 7/1993 |
| EP | 1009131 | 12/1998 |
| WO | 98/27695 | 12/1997 |

OTHER PUBLICATIONS

L. Li and A. K. Somani, "Dynamic Wavelength Routing Using Congestion and Neighborhood Information", IEEE/ACM Transactions on networking, vol. 7, No. 5, Oct. 1999, pp. 799–786.*

L. Szymanski and O. W. W. Yang, "Spanning Tree Algorithm for Spare Network Capacity", IEEE, pp. 0447–0452.**

"Spanning Tree Method For Link State Aggregation in Large Communication Networks," Whay Chiou Lee, vol. 1, pp. 297–302.

* cited by examiner

Primary Examiner—Kwang B. Yao
Assistant Examiner—Thai D Hoang
(74) Attorney, Agent, or Firm—Squire, Sanders & Dempsey LLP

(57) ABSTRACT

This invention relates to routing in a communication network. In particular, the invention concerns routing in telecommunication and cellular networks. The idea of the invention is to preprocess the network in order to accelerate the routing process. The preprocessing comprises finding the difficult network portions, and removing trivial network portions from the network topology. As a result of these phases the network is divided into small subnetworks. After the preprocessing predetermined endpoints of a single route are added into the subnetworks for finding the route through the network. After that, traffic in each subnetwork is routed separately. Traffic in the network parts between the subnetworks, or between the endpoints and the subnetworks, may need additional routing.

5 Claims, 4 Drawing Sheets

ROUTING IN A COMMUNICATION NETWORK

This application is a continuation of international application serial number PCT/FI01/00449, filed Jun. 14, 2000.

FIELD OF THE INVENTION

This invention relates to routing in a communication network. In particular, the invention concerns routing in telecommunication and cellular networks. Generally, the term routing describes choosing a data stream path between two endpoints. In this text routing also means a process to route the whole network, i.e. to route all data streams in a network.

BACKGROUND OF THE INVENTION

The routing process of a network is not a simple task. The network can be divided, for example, into three main levels: physical, path, and logical levels. The physical level describes a real physical network, where nodes and lines have been located. The path level makes it clear how channels (for example packets) have been routed via the nodes. This level is significant concerning choices for back-up routes as well. The logical level describes how a single node (for example a base station) sees the network, i.e. depicts transparent connections. All these layers have to be taken into account for making a working routing.

A network can be hundreds or even thousands of nodes in size. Taking into account the above-mentioned matters, the routing of the network can be very time-consuming. In general, routing methods are based on algorithms that calculate the best or near best routing alternative. Sophisticated algorithms typically yield good results, but they normally consume time. Alternatively coarse algorithms yield poor results, but they are fast. To achieve good results fast at present, very fast computers are used.

It is also possible to divide a routing problem into several small parts, which are solved separately. In this case, the division is based on entities which have as few common parameters as possible, i.e. there exist as few interfaces between entities as possible. Another way to solve a routing problem is hierarchical technique in which the most important parameters are solved and fixed first, and after that the next set of parameters is solved and fixed, and so on, until there are no parameters left. Usually both, the division and hierarchical technique need manual work, which is time-consuming.

Fast expensive computers are not always available. Spending more time with the good algorithms can be too time-consuming. Dividing the network into small subnetworks needs expensive and time-consuming manual work. However, to have a fast sophisticated routing method is especially important for new enlarging cellular networks, which are significantly larger than older networks. The objective of the invention is to alleviate the above-mentioned drawbacks of the known solutions and to increase effectiveness in the known solutions. This is achieved in a way described in the claims.

SUMMARY OF THE INVENTION

The idea of the invention is to preprocess the network in order to accelerate the routing process. The preprocessing comprises finding the difficult network portions, and removing trivial network portions from the network topology. As a result of these phases the network is divided into small subnetworks. After the preprocessing predetermined endpoints of a single route are added into the subnetworks for finding the route through the network. After that, traffic in each subnetwork is routed separately. Traffic in the network parts between the subnetworks, or between the endpoints and the subnetworks, may need additional routing, but they are simple to perform.

BRIEF DESCRIPTION OF THE DRAWINGS

In the following the invention is described in more detail by means of FIGS. 1–6 in the attached drawings where.

DETAILED DESCRIPTION OF THE INVENTION

Figure 1:
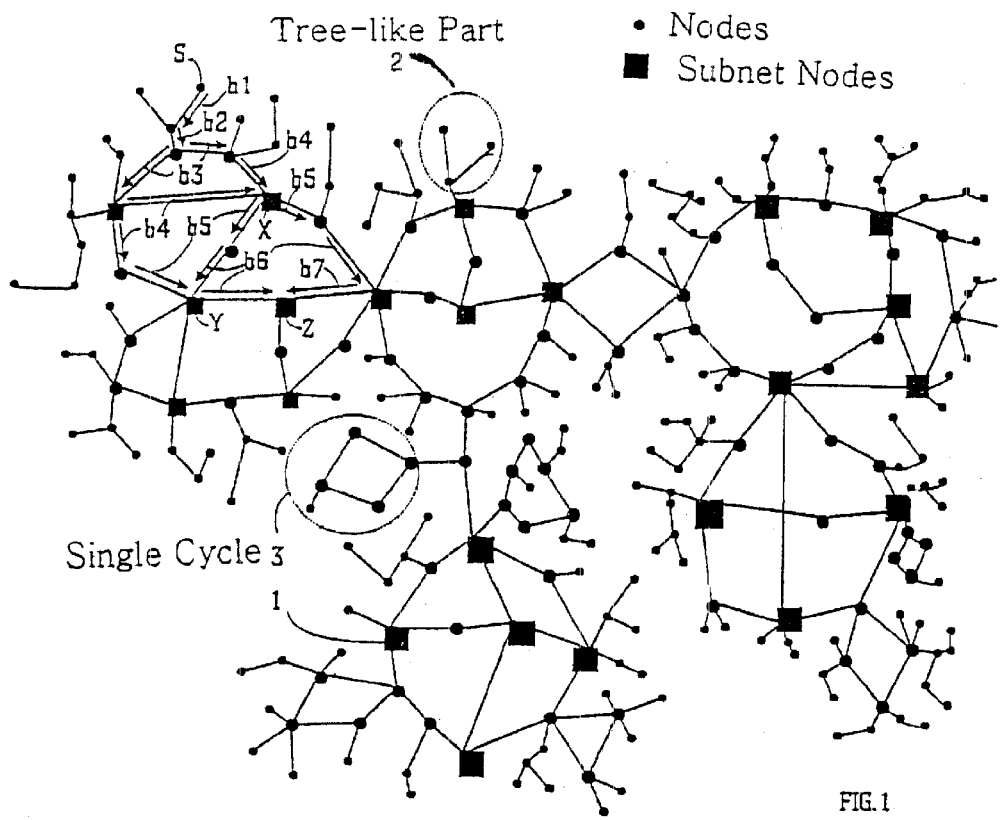
FIG. 1 illustrates an example of a telecommunication network.

FIG. 1 shows an example of a typical telecommunication network. The aim of preprocessing the network is to find difficult parts of routing and to remove trivial, easy to route, parts. Let's call the difficult parts subnetworks. When the subnetworks have been found, the routing is much easier than the routing of the whole network. The preprocessing makes it possible to route within each subnetwork separately, which enables the efficient use of good and fast routing algorithms. The preprocessing is possible to adapt to almost any routing algorithm. For clarifying the explanation of the preprocessing, the nodes (1) that belong to some subnetwork have been marked in squares in FIG. 1. In order to understand the text the following definitions should be kept in mind:

1. an edge is a transmission link between two nodes in a desired routing network level, i.e. describes a physical link or a logical link or a SDH stream link, for example;

2. a cycle is a path that starts and ends in the same node, and contains at least three nodes; cycles are different if the set of edges a cycle uses is different than the set of edges of another cycle;

3. an edge is a meshing edge is if there are more than one different cycle through it;

4. a mesh is the part of a network which contains meshing edges and endpoint nodes of the meshing edges forming overlapping cycles; there can be several separate meshes in the network.

Figure 2:
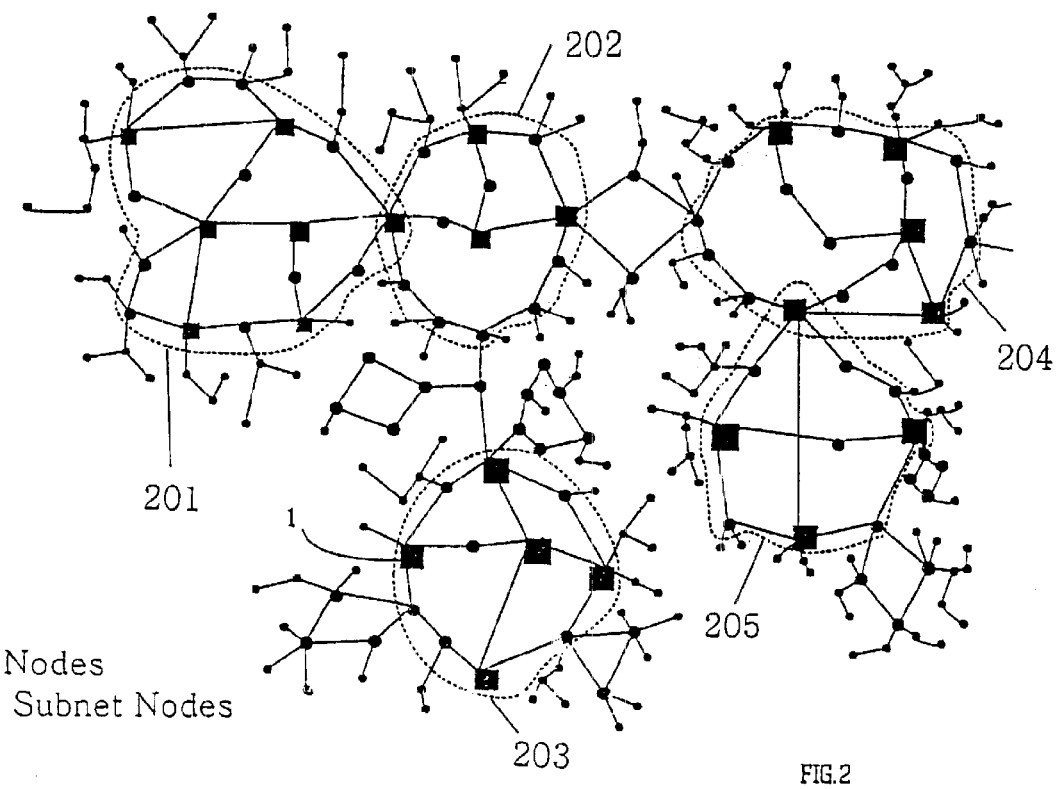
FIG. 2 illustrates meshing edges found in the telecommunication network.

For finding subnetworks, meshing edges of the network must be found. One way to find meshing edges (and meshes) is to use an edge-coloring algorithm. There are a background color and two sets of colors, called cycle and region colors. Initially all edges are background color. The examination of a network starts from an arbitrary node (S) (See FIG. 1) where a search tree is created. The search tree grows by finding (new edges. FIG. 1 shows an example of the expanding search tree. The oldest branch has been marked b1, the second oldest b2, and the youngest branch b7. Interesting nodes where the branches hit together have been marked in capital letters X, Y and Z. When a branch of the search tree hits another branch, a cycle has been found. The cycle is examined by checking the colors of the edges. If all edges are background color (hitting node X), the cycle is new and painted in a new cycle color. If there are no edges with region colors, but at least one edge with a cycle color (huffing node Y), the edges in the cycle and all intermingling cycles are painted in a new region color. If there is an edge with a region color (hitting node Z), the edges of the new cycle are meshing edges. The new cycle and all intermingling cycles are colored with the same region color. After the whole network has been searched, all meshes have been colored in different region colors, non-meshing cycles in cycle colors, and the rest of the edges in background color. It is worth noticing that each mesh and cycle has been colored in different identifying colors. FIG. 2 shows the meshes found (201–205), circled in dashed lines. These edge-coloring algorithms can be implemented by using union-find algorithms.

Figure 3:
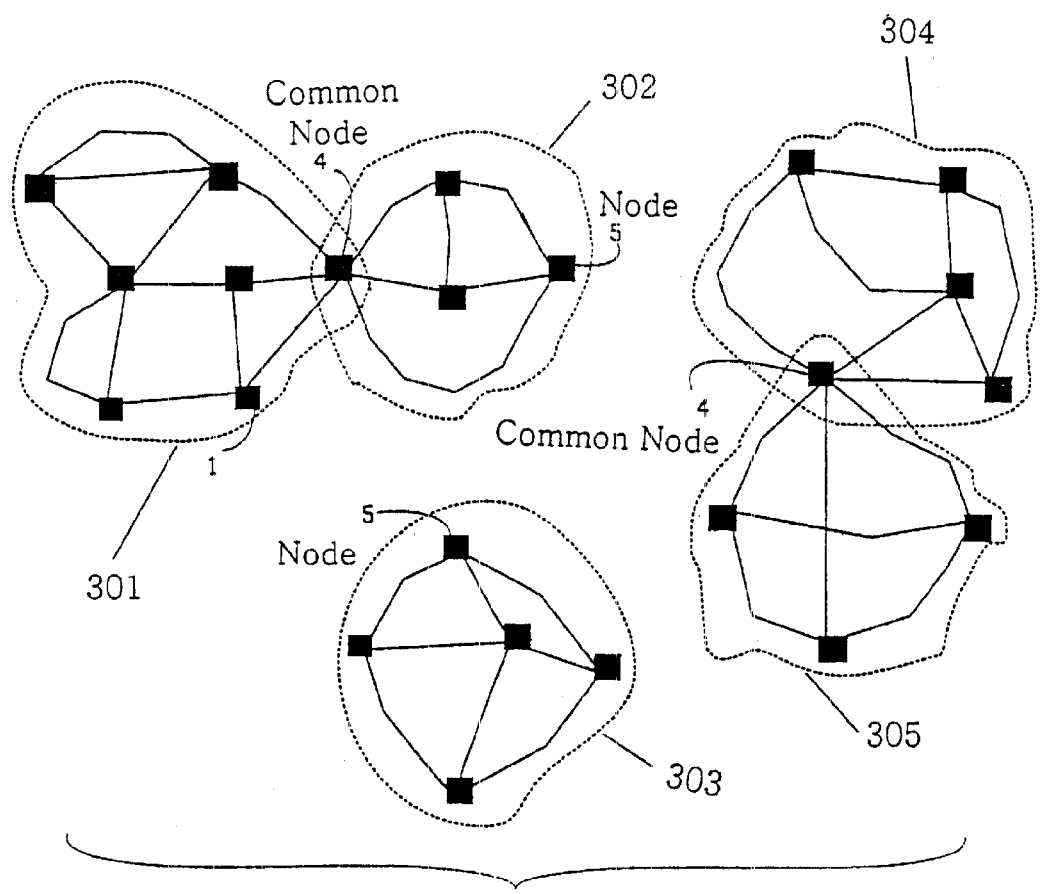
FIG. 3 illustrates subnetworks of the network depicted in FIG. 1.

After finding the meshes, the nodes and edges that do not belong to any one of the meshes can be removed from the network. The nodes that belong to the mesh and are not connected to more than two meshing edges (degree-two nodes) are hidden. Now, the subnetworks (301–305) (FIG. 3) have been separated from the network. Notice that the process removes both tree-like parts (2), (FIG. 1) and single cycles (3), (FIG. 1).

Figure 4:
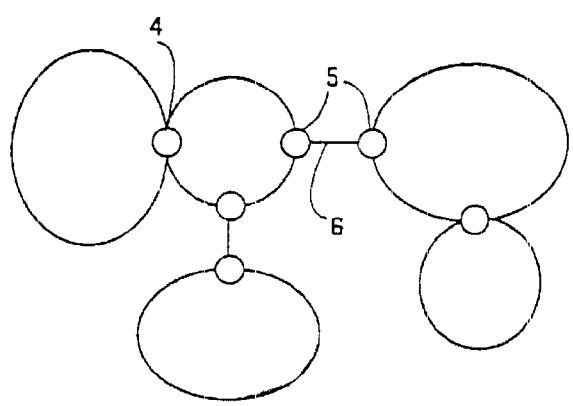
FIG. 4 illustrates connections between the subnetworks depicted in FIG. 3.

Subnetworks are connected to each other by a common node or by a non-meshing section of the network between them. FIG. 4 shows the connections between the subnetworks of the above-mentioned network. Small circles depict gateway nodes, either a common node (4) or a node (5) with a connection to the non-meshing network part (6) between two meshes. Notice that a degree-two node of the mesh can be a gateway node.

The preprocessing has been finished now, and a route for each traffic need has to be found through the whole network. Each traffic need is routed first through a chain of subnetworks (FIG. 4) (and non-meshing network parts), i.e. relevant subnetworks are found. Gateway nodes are defined in each subnetwork for each traffic need. If subnetworks do not include all predetermined endpoints of a route, modification of the subnetworks is needed. The missing endpoints (A, B), (FIG. 5) are added to the subnetworks by using representing endpoints in the subnetworks. There are two possible cases: 1) An endpoint node (A) is connected to a node (A') in the subnetwork through a new edge (7). Notice that the degree-two node of the mesh can not be a connective node in this case. 2) An endpoint node (C) is the degree-two node of the mesh. In this case, the edges (E1, E2) from the degree-two node replace the corresponding edge (E1+E2) of the subnetwork.

After finding the routes through the chain of the subnetworks, traffic within each subnetwork can be routed separately. To get a corresponding route in the original network, each edge of the subnetwork corresponds to a path in the original network. The traffic within the connections (7,8) from the endpoints to the nodes of the subnetwork and within the inter-connections (9) between the subnetworks may need routing but those are easy to make. It is worth noting that traffic needs can be routed one at a time or simultaneously depending on an implementation.

Figure 5:
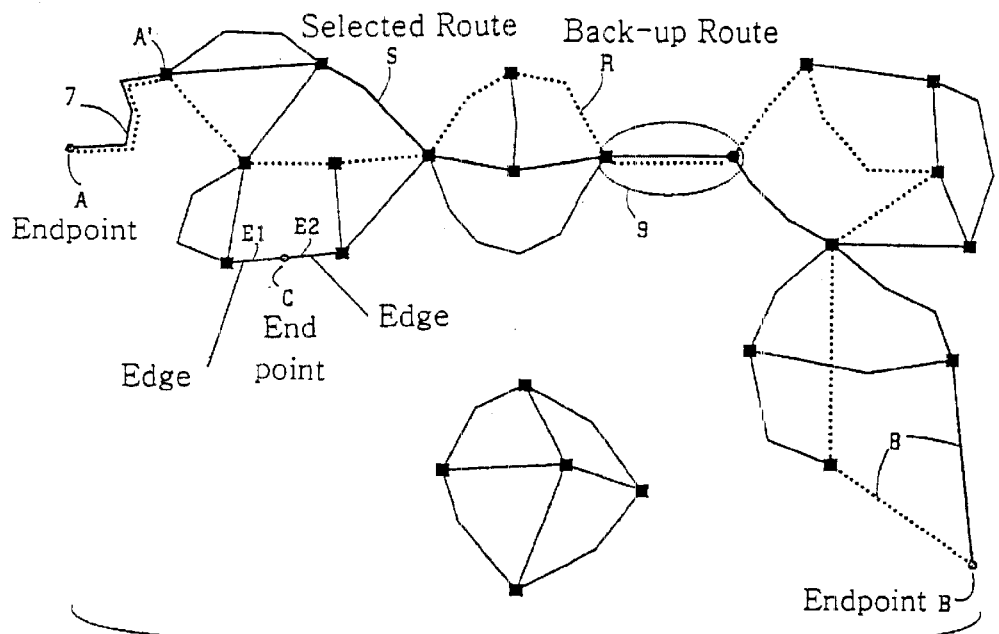
FIG. 5 illustrates routing in preprocessed subnetworks.
Figure 6:
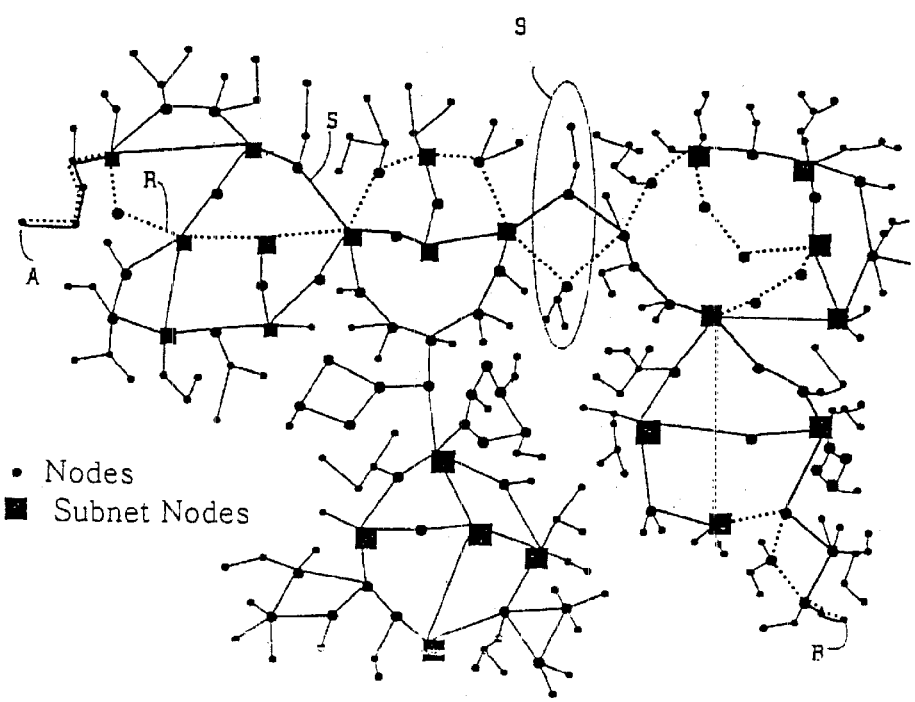
FIG. 6 illustrates a physical route through the telecommunication network.

FIG. 5 illustrates the routing between the endpoints A and B in the preprocessed subnetworks. The selected route (S) has been marked in a thick line, the back-up route (R) in a dotted line. The inter-connection (9) between the subnetworks has been surrounded by a dashed line. FIG. 6 shows the corresponding routing in the original network.

Figure 7:
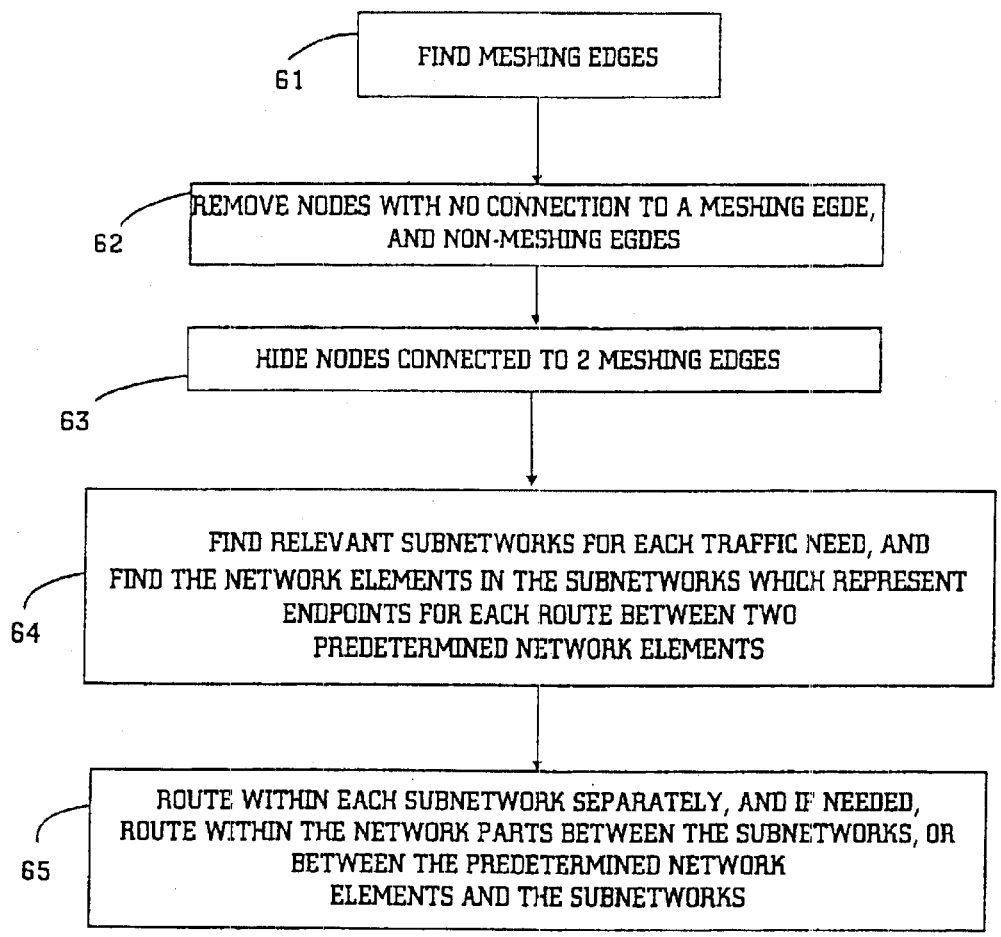
FIG. 7 shows the invention in a flow chart format.

FIG. 7 shows the invention as a flow chart form. The first phase (61) is to find meshing edges. After this, the nodes that do not have a connection to any of the meshing edges and the non-meshing edges are removed (62). The third phase (63) is to hide the nodes which have been connected to two meshing edges. After the third phase, a chain of relevant subnetworks for each traffic need is found (64), and also the network elements inside the subnetworks, which elements represents endpoints for each route between the preterminated network elements. After that, the final phase (65) is to route within each subnetwork separately. And if needed, the traffic needs within the non-meshing network parts (the endpoint connections, the connections between the subnetworks) are routed as well.

The invention works well in telecommunications networks where there exist trivial network parts and where it is possible to separate small subnetworks. The preprocessing is very fast to perform. The invention offers a fast method for routing. Extremely fast computers are not needed, a normal computer is capable of handling routing in an acceptable length of time. The result of the routing is good. Expensive and time-consuming manual work is not needed. Although the invention is described in a way of the examples above, it is clear that the invention is not restricted to these, but it can be used in other solutions as well, in the scope of the inventive idea.

What is claimed is:

1. A method for routing data streams through a communication network, which comprises network elements and transmission links, the method comprising determining routes for data streams between predetermined network elements, wherein the determining process comprises the steps of finding the transmission links which belong to at least two transmission link loops, removing from the network (a) the transmission links and the network elements which fail to belong to any loop that comprises at least one transmission link found in the finding step, and (b) hiding the network elements which belong to any of the loops that comprises at least one transmission link found in the finding step and which have been connected to at most two transmission links found in the finding step, whereby the remaining network comprises at least one subarea which comprises at least two loops, for each data stream, finding the subareas through which a route can be found between two predetermined network elements, routing within the subareas separately and, if needed, routing separately within the network parts between the subareas or between the predetermined network elements and the subareas.

2. A method according to claim 1, wherein the step of finding the subareas further comprises finding the network elements, which represent the two predetermined network elements, inside the found subareas, being the predetermined network element itself or being the neighboring network element for the predetermined network element.

3. A method according to claim 1 wherein the step of finding the subareas includes finding the shortest chain of the subareas between the predetermined network elements, for each data stream.

4. A method according to claim 1, wherein the routing step includes determining a main route and a back-up route.

5. A method according to claim 1, wherein the finding of the transmission links comprises the steps of:
    finding the transmission link loops,
    finding the areas that contain loops which have at least one common transmission link,
    registering the found loops and areas.

* * * * *

UNITED STATES PATENT AND TRADEMARK OFFICE
CERTIFICATE OF CORRECTION

PATENT NO. : 6,588,953 B2  Page 1 of 1
DATED : July 8, 2003
INVENTOR(S) : Jyrki Akkanen It is certified that error appears in the above-identified patent and that said Letters Patent is hereby corrected as shown below:

<u>Title page,</u>
Item [63], please delete "Jun. 14, 2000", and insert therefore -- May 10, 2001 --.

Signed and Sealed this

Twenty-fifth Day of November, 2003

JAMES E. ROGAN
*Director of the United States Patent and Trademark Office*